May 12, 1953 J. V. URBANO 2,638,144
CLAMP AND ACTUATING MECHANISM THEREFOR FOR SETTING
ADHESIVELY BOUND FACINGS TO CLUTCH PLATES
Filed June 26, 1952 2 Sheets-Sheet 2

INVENTOR.
Joseph V. Urbano,
BY George D. Richards,
Attorney

Patented May 12, 1953

2,638,144

UNITED STATES PATENT OFFICE 2,638,144

CLAMP AND ACTUATING MECHANISM THEREFOR FOR SETTING ADHESIVELY BOUND FACINGS TO CLUTCH PLATES

Joseph V. Urbano, Newark, N. J.

Application June 26, 1952, Serial No. 295,771

5 Claims. (Cl. 154—1)

This invention relates to a clamping device and means for actuating the same; and the invention has reference, more particularly, to a clamping device for use in setting adhesively bound facings to faces of clutch plates, including means for applying setting pressure to the clamping device.

To a large extent the practice of adhesively bonding facings to the surfaces of clutch plates, such e. g. as used in automotive vehicles, has replaced prior methods of fastening such facings in place.

In the practice of adhesively bonding frictional facing material to the surfaces of clutch plates, a suitable thermo-setting adhesive is applied between meeting surfaces of the facing material and the clutch plate, and while the facings and clutch plate are firmly held together by application of strong unyielding pressure thereto, the assembly is subjected to heat, as e. g. by deposit thereof in a baking oven, whereby to set the adhesive, and thus effect a strong bonding of the facing material to the clutch plate.

In such practice, in order to assure tight and uniform meeting of the contacting surfaces of the frictional facing material and the clutch plate throughout the entire area thereof, it is necessary to provide clamping means capable of applying pressure upon the assembly ranging from 1500 to 3000 pounds per square inch, and then maintaining such pressure without relaxation during the baking operation by which the adhesive is set, whereby to assure a uniform and strong bond free from voids, blisters or non-adhered areas.

To facilitate the aforesaid adhesive bonding practice, it is an object of this invention to provide a novel construction of holding clamp means operative upon a clutch plate and facing assembly provided with an intermediate application of thermo-setting adhesive substance, together with means cooperative with said clamp means for applying required pressure to the assembly; and said clamp means including means to releasably lock the same against relaxation of applied pressure after the pressure applying means is removed.

A further object of this invention is to provide a clamp device comprising a pair of opposed, suitably reenforced, clamp plates axially mounted upon a supporting tie-rod means, between which clamp plates the clutch plate and facing assembly can be disposed subject to squeezing pressure exerted by forcing said clamp plates one toward the other; and to provide separable means cooperative with the clamp plates and their tie rod means for transmitting forcing pressure to said clamp plates, and further including, in detachable association with said force transmission means, means, preferably in the form of a hydraulic jack device, operative to develop and apply pressure through said force transmission means to the clamp plates.

The above and other objects of this invention will be understood from a reading of the following detailed description of the invention in connection with the accompanying drawings, in which:

Fig. 3 is a top end plan view of the force transmission means of the clamping apparatus of this invention, with the pressure developing and applying means removed therefrom; and Fig. 4 is a side elevational view of the force transmission means, viewed from the right of Fig. 3.

Similar characters of reference are employed in the above described views, to indicate corresponding parts.

Figure 1:
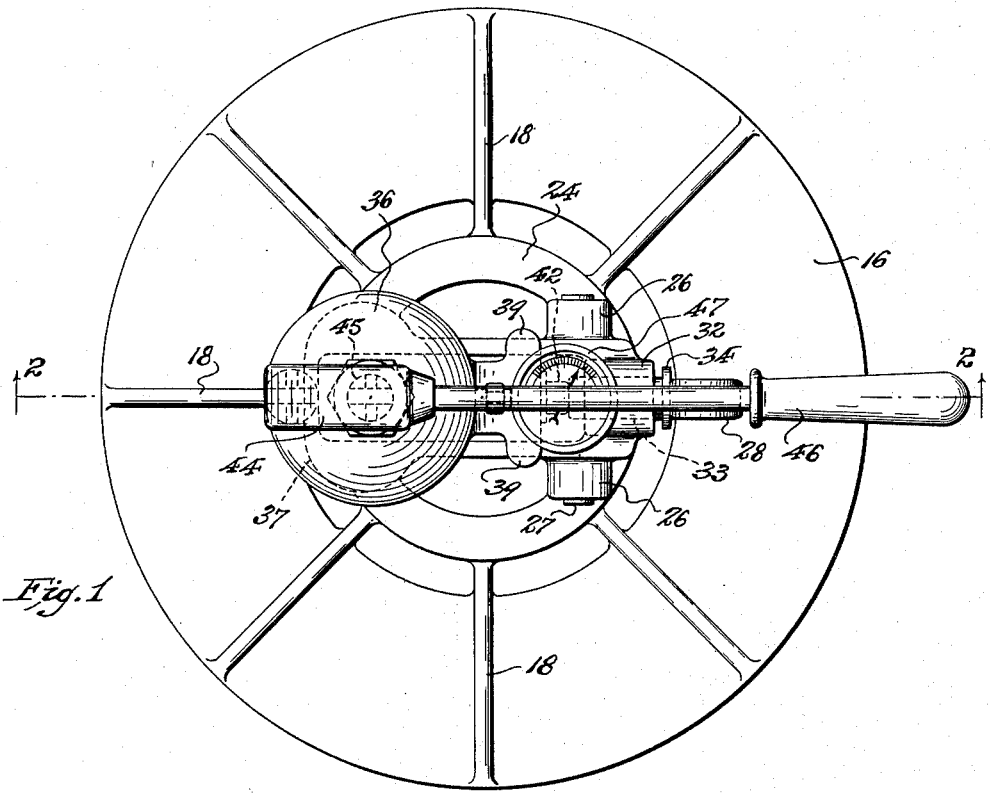
Fig. 1 is a top plan view of the clamp and actuating means therefor, according to this invention, as arranged in operative pressure developing and applying relation to a clutch plate and facing assembly.

Referring to the drawings, the clamp device comprises a centrally open annular bottom clamp plate 10 having a downwardly offset central hub plate 11 of reduced diameter from which it is supported and reenforced by radial spider arms 12. The hub plate 11 is provided with a central or axial opening 13. Extending upwardly through said opening 13 of the hub plate 11 is a tie rod 14. Said tie rod 14 is provided with a diametrically enlarged foot piece or stop flange 15 upon which said hub plate of the bottom clamp plate 10 seats, whereby to couple said bottom clamp plate in operative assembled relation to the tie rod. The reference character 16 indicates a centrally open annular top clamp plate which is provided with an upwardly offset central hub plate 17 from which it is supported and reenforced by radial spider arms 18. Said hub plate 17 is also provided with a central or axial opening 19 to engage the same over the upper free end portion of the tie rod 14, whereby to be slidably mounted upon said tie rod so as to dispose said top clamp plate 16 in opposition to the bottom clamp plate 10. The upper free end portion of the tie rod is externally screw threaded to receive a locking nut 20. Extending axially upward from the free end of the tie rod 14 is a draft shank 21 which terminates at its upper end in an enlarged head 22 for purposes to be subsequently herein set forth.

Figure 2:
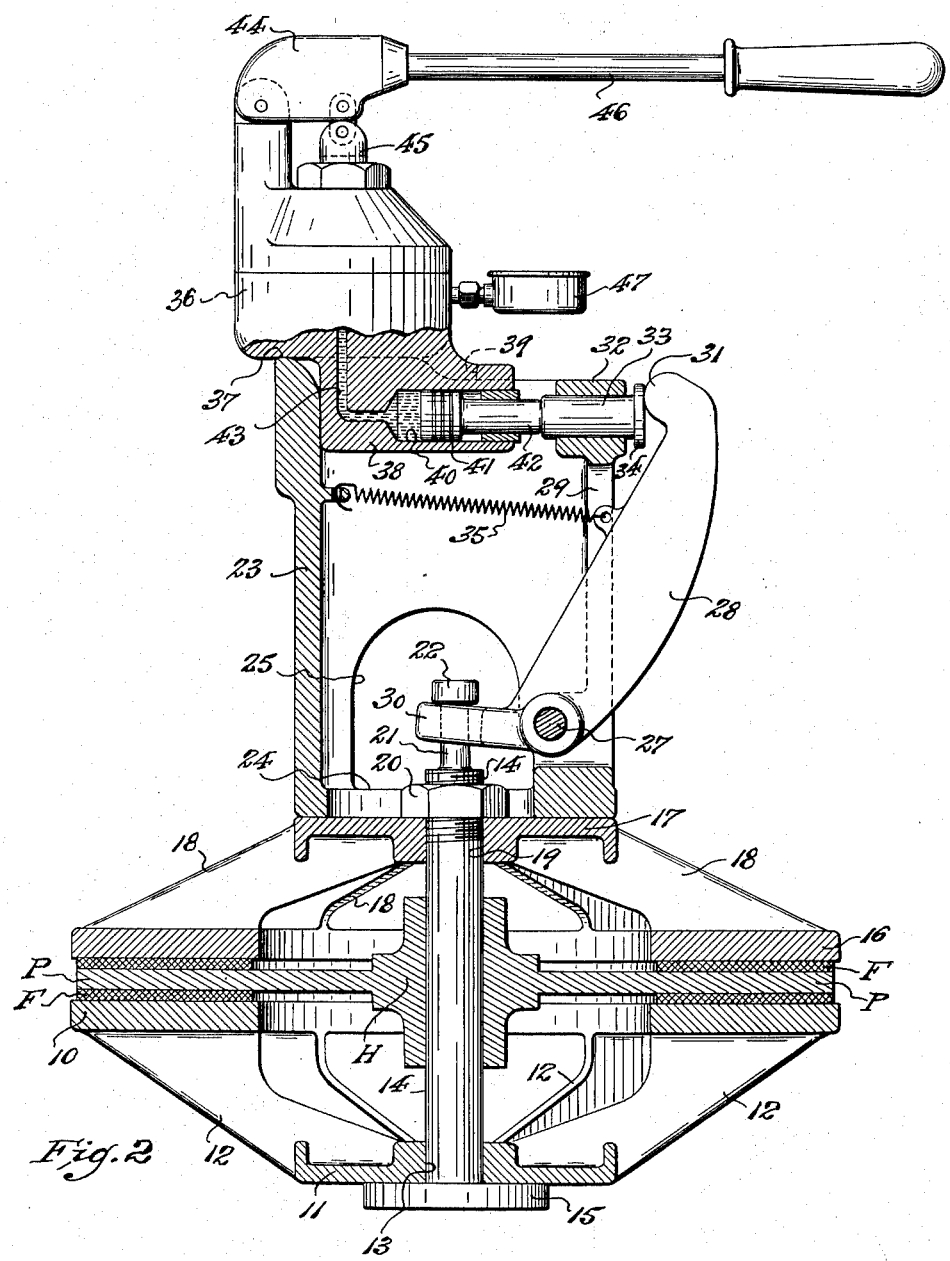
Fig. 2 is a central longitudinal vertical sectional view of the same, taken on line 2—2 in Fig. 1.

To apply the clamp device in operative relation to a clutch plate and facing assembly, the locking nut 20 is removed from the tie rod 14, and the top clamp plate 16 is then withdrawn from the tie rod. Clutch facing bodies F of suitable friction material are applied to one or both faces of a clutch plate P with interposed application between the meeting surfaces thereof of a suitable thermosetting adhesive substance by which said facing bodies are to be bonded to the clutch plate. The axial opening of the hub H of the clutch plate P is engaged with the tie rod 14 and the clutch plate and facing assembly is slid down on the latter until the under side of said assembly abuts the bottom clamp plate 10, whereupon the top clamp plate 16 is reengaged over the tie rod 14, and disposed to abut the opposite or upper side of the clutch plate and facing assembly, thus sandwiching said assembly between the clamp plates 10 and 16 (see Fig. 2). The locking nut 20 is thereupon screwed back onto the free end of the tie rod 14 and home against the hub plate 17 of the top clamp plate 16, thus initially securing the clutch plate and facing assembly in operative relation to the clamp device, ready for application of pressure to said assembly.

The clamp device having been applied to the clutch plate and facing assembly, the means for transmitting forcing pressure to the clamp device is thereupon applied thereto. The force transmission means comprises an upstanding endwise open frame or column 23 having a centrally open annular base flange 24. Opposite side walls of the frame or column 23 are provided with openings 25 giving access to the lower interior portion of the frame or column. Supported by and between transversely aligned bearing portions 26, which are formed in connection with the sides of the frame or column, and which are disposed in outwardly offset relation to the axis of said frame or column and adjacent to the bottom end thereof, is a transverse fulcrum shaft 27 upon which is pivoted, by its lower end, an upwardly extending force transmission lever 28. Said lever 28 extends outwardly through an opening 29 in the wall of the frame or column 23, so that its upper free end projects exteriorly from said frame or column. Extending angularly inward from the pivoted end of said force transmission lever 28 is a bifurcate bell-crank arm 30. The upper end of the lever 28 preferably terminates in an angular, inwardly directed thrust nosing 31. Slidably supported by and for extension through the axial opening of a guide member 32, with which the frame or column 23 is provided, so as to be aligned with and opposed to the upper end of the force transmission lever 28, is a longitudinally movable thrust rod 33, the outer end of which is adapted to engage the thrust nosing 31 of said lever 28. Said thrust rod 33 is provided at its outer end with a diametrically enlarged head 34, adapted to abut the outer end of the guide member 32, whereby to limit inward retractive movements of the thrust rod 33 and the force transmission lever 28. Connected between the force transmission lever 28 and an opposed wall of the frame or column 23 is a pull-spring 35 which yieldably holds the force transmission lever and thrust rod in normal initial retracted positions. To operatively apply said force transmission means to the clamp device, the base flange 24 of the frame or column 23 is footed on the top of the hub plate 17 of the top clamp plate 16, so that said frame or column upstands thereon in axially aligned relation to the clamp device, with the upper end of the tie rod 14, the locking nut 20, and draft shank 21 projecting axially upward within the lower interior of said frame or column. When so disposing the force transmission means, the bifurcate bell-crank arm 30 of the force transmission lever 28 is caused to straddle the draft shank 21 beneath and in engagement with the head 22 of the latter (see Fig. 2).

Means is provided for developing and applying pressure to the lever 28 of the force transmission means. In a preferred form thereof, said pressure developing and applying means comprises a hydraulic jack mechanism, which is adapted to be detachably mounted in operative connection with and upon the upper end of the frame or column 23 of the force transmission means. Said hydraulic jack mechanism is substantially the same in form and detail construction as that disclosed in my prior United States Letters Patent No. 2,515,746, to which reference is made for detailed description thereof. Generally, said hydraulic jack mechanism comprises a main body 36 adapted to be detachably supported upon a seating member 37 with which the top end of the frame or column 23 of the force transmission means is provided. Formed as an integral part of the body 36, to depend from the bottom thereof, is a forwardly offset extension 38, the same being of reduced width to permit its insertion into the upper open end of the frame or column 23 of the force transmission means, when the body 36 is seated on said means, and so that its rear end abuts and is stopped against a wall of the latter, whereby to thrust against said wall. The extension 38 is provided, at the upper level of its forward end portion, with laterally and oppositely extending footing lugs 39 which respectively rest upon the tops of opposite side walls of the frame or column 23 of the force transmission means, to further stabilize the support of the hydraulic jack mechanism in its operative mounted association with said frame or column 23. The extension 38 of the jack body 36 is provided with a longitudinally extending cylinder bore 40. Slidably movable in said cylinder bore 40 is a piston 41 having an outwardly projecting jack plunger 42 which is longitudinally aligned with and opposed to the inner end of the thrust rod 33 of the force transmission means, when the hydraulic jack mechanism is operatively mounted upon the latter. Leading from the pump means (not shown) of the hydraulic jack mechanism is a fluid flow passage 43 which communicates with the rear end of the cylinder bore 40 to deliver fluid under pressure thereto. The hydraulic jack mechanism is provided with a pivoted pump actuating lever 44, and which is suitably coupled to the pump plunger 45. Said pump lever is provided with a handle bar 46 by which the same can be manually operated. The hydraulic jack mechanism is provided with a developed pressure indicating gauge 47.

When the hydraulic jack mechanism is in place ready for operation, the operator, by manipulating the pump actuating lever 44 causes delivery of fluid under pressure to the cylinder bore 40. Under the thrust of the pressure fluid, the piston 41 is outwardly projected so as to forcibly thrust the jack plunger 42 against the thrust rod 33, whereby to move the latter outwardly against the force transmission lever 28. The force thus applied to the lever 28 swings the same outwardly, and thereby causes its bell-crank arm 30 to swing upwardly against the head 22 of the draft shank 21 of the clamp device tie rod 14. In this manner, a powerful up draft is transmitted to the tie rod 14, which is communicated to the bottom clamp plate 10 through the tie rod stop flange 15. At the same time, a strong down thrust is communicated through the frame or column 23 of the force transmission means to the top clamp plate 16. As a result of these occurrences, the clamp plates 10 and 16 are powerfully moved one toward the other, whereby to apply strong squeezing pressure in desired degree to the intermediate clutch plate and facing assembly, thereby assuring uniform and complete contact of the opposed surfaces of the clutch plate and facing bodies with the interposed bonding adhesive, and thus assuring a strong bond therebetween, free from voids, blisters or non-adhering areas. The desired degree of applied pressure can be thus quickly applied, and will be visually indicated by the gauge of the hydraulic jack mechanism.

When the required pressure has been developed and applied through the clamp device to the clutch plate and facing assembly, said clamp device can be locked against relaxation of the applied pressure by tightening home the locking nut 20, access to which is readily attainable through a side opening 25 of the frame or column 23 of the force transmission means. After the locking nut 20 is tightened to secure the clamp device against relaxation of applied pressure, the hydraulic jack mechanism can be manipulated to release its developed pressure and then removed from the force transmission means, whereupon the latter can also be detached from the clamp device and its tie rod and laid aside.

The clamp device, as locked to hold the clutch plate and facing assembly under pressure, can now be deposited in a baking oven or subjected to other suitable heat applying means, whereby the thermo-setting adhesive between the clutch plate and facing bodies is caused to harden and set in strong bonding relation to these parts. Upon completion of the heat treatment, the top clamp plate 16 may be released and withdrawn from the tie rod 14, and thus separated from the bottom clamp plate 10, so that the bonded clutch plate and facing assembly can thereupon be removed from the clamp device, leaving the latter available for repetitive use.

Having now described my invention, I claim:

1. Clamping apparatus of the character described comprising a pair of clamp plates between which a clutch plate and facing material to be bonded thereto by interposed adhesive can be received, a tie rod extending from one clamp plate axially through the other clamp plate, a force transmission means adapted to be removably mounted on said last named clamp plate and including a pivoted bell-crank lever, cooperative means for detachably coupling one arm of said lever to the free end of said tie rod, pressure applying means adapted to be supported by said force transmission means and manipulatable to exert force transmitting pressure upon the other arm of said lever, and a locking nut threaded onto the free end of said tie rod to engage said last named clamp plate, whereby to hold said clamp plates in clamping relation to the interposed clutch plate and facing material after the force transmission means and pressure applying means are removed from the clamp plates.

2. Clamping apparatus of the character described comprising a pair of clamp plates between which a clutch plate and facing material to be bonded thereto by interposed adhesive can be received, a tie rod extending from one clamp plate axially through the other clamp plate, a force transmission means adapted to be removably mounted on said last named clamp plate and including a pivoted bell-crank lever, cooperative means for detachably coupling one arm of said lever to the free end of said tie rod, a hydraulic jack means removably engageable with said force transmitting means and manipulatable to exert force transmitting pressure upon the other arm of said lever, and a locking nut threaded onto the free end of said tie rod to engage said last named clamp plate, whereby to hold said clamp plates in clamping relation to the interposed clutch plate and facing material after the force transmission means and said hydraulic jack means are removed from the clamp plates.

3. Clamping apparatus of the character described comprising a pair of clamp plates between which a clutch plate and facing material to be bonded thereto by interposed adhesive can be received, a tie-rod extending from one clamp plate axially through the other clamp plate, a force transmission means comprising an endwise open frame adapted to be removably mounted on said last named clamp plate in upstanding, axially aligned relation thereto and to said tie rod, a bell-crank lever pivotally connected with said frame, cooperative means for detachably coupling one arm of said lever to the free end of said tie rod, pressure applying means adapted to be supported by said frame of the force transmission means and manipulatable to exert force transmitting pressure upon the other arm of said lever, a locking nut threaded onto the free end of said tie rod to engage said last named clamp plate, whereby to hold said clamp plates in clamping relation to the interposed clutch plate and facing material after the force transmission means and pressure applying means are removed from the clamp plates, and said frame of the force transmission means having a lateral opening giving access to said locking nut.

4. Clamping apparatus of the character described comprising a pair of clamp plates between which a clutch plate and facing material to be bonded thereto by interposed adhesive can be received, a tie-rod extending from one clamp plate axially through the other clamp plate, a force transmission means comprising an endwise open frame adapted to be removably mounted on said last named clamp plate in upstanding, axially aligned relation thereto and to said tie rod, a bell-crank lever pivotally connected with said frame, cooperative means for detachably coupling one arm of said lever to the free end of said tie rod, a hydraulic jack means removably engageable with the upper end of said frame and manipulatable to exert force transmitting pressure upon the other arm of said lever, a locking nut threaded onto the free end of said tie rod to engage said last named clamp plate, whereby to hold said clamp plates in clamping relation to the interposed clutch plate and facing material after the force transmission means and said hydraulic jack means are removed from the clamp plates, and said frame of the force transmission means having a lateral opening giving access to said locking nut.

5. Clamping apparatus of the character described comprising a pair of clamp plates between which a clutch plate and facing material to be bonded thereto by interposed adhesive can be received, a tie rod extending from one clamp plate axially through the other clamp plate, a force transmission means comprising an endwise open frame adapted to be removably mounted on said last named clamp plate in upstanding, axially aligned relation thereto and to said tie rod, a bell-crank lever pivotally connected with said frame, cooperative means for detachably coupling the lower horizontal arm of said lever to the free end of said tie rod, a thrust rod slidably supported at the upper end of said frame in opposition to the vertical arm of said lever, a hydraulic jack means removably engageable with the upper end of said frame, said jack means having a jack plunger adapted to be aligned with and opposed to said thrust rod, said jack means being operative to exert force transmitting pressure through said thrust rod upon said vertical arm of said lever, a locking nut threaded onto the free end of said tie rod to engage said last named clamp plate, whereby to hold said clamp plates in clamping relation to the interposed clutch plate and facing material after the force transmission means and said hydraulic jack means are removed from the clamp plates, and said frame of the force transmission means having a lateral opening giving access to said locking nut.

JOSEPH V. URBANO.

References Cited in the file of this patent

UNITED STATES PATENTS

| Number | Name | Date |
|---|---|---|
| 1,479,712 | Hallett | Jan. 1, 1924 |